(12) United States Patent
DeMent et al.

(10) Patent No.: US 6,967,510 B2
(45) Date of Patent: Nov. 22, 2005

(54) TIME-BASE IMPLEMENTATION FOR CORRECTING ACCUMULATIVE ERROR WITH CHIP FREQUENCY SCALING

(75) Inventors: Jonathan James DeMent, Austin, TX (US); Rolf Hilgendorf, Boeblingen (DE); Cedric Lichtenau, Boeblingen (DE); Michael Fan Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 10/687,251

(22) Filed: Oct. 16, 2003

(65) Prior Publication Data

US 2005/0083087 A1 Apr. 21, 2005

(51) Int. Cl.[7] ............................................. H03K 19/00
(52) U.S. Cl. ..................................... 327/141; 327/160
(58) Field of Search ......................... 327/141, 160–163

(56) References Cited

U.S. PATENT DOCUMENTS 5,459,419 A * 10/1995 Hatakenaka ................ 327/141
5,982,833 A * 11/1999 Waters ....................... 375/372
6,239,635 B1 * 5/2001 Matsuzaki .................. 327/160

* cited by examiner

*Primary Examiner*—Dinh T. Le
(74) *Attorney, Agent, or Firm*—Carr LLP; Diana R. Gerhardt

(57) ABSTRACT

The present invention provides for supporting an on chip-timer facility and, more particularly, to the generation of a constant time incremental increase while changing core mesh-clock frequency. A latch is coupled to the output of a first free-running clock. An inverter is coupled to the output of the first latch. At least one other secondary latch is coupled to the output of the first latch. An edge detector is coupled to the output of the secondary latch. An incrementer or decrementer is coupled to the output of the edge detector. A memory is coupled to the output of the incrementer or decrementer.

17 Claims, 5 Drawing Sheets

US 6,967,510 B2

TIME-BASE IMPLEMENTATION FOR CORRECTING ACCUMULATIVE ERROR WITH CHIP FREQUENCY SCALING

TECHNICAL FIELD

The invention relates generally to supporting an on chip-timer facility and, more particularly, to the generation of a constant incremental increase while changing core clock frequencies.

BACKGROUND

Timekeeping is an important function of computer systems. After boot-up, a system clock of a microprocessor (MPU) is initialized to keep time according to the number of clock cycle updates that it receives. In a first configuration, the MPU uses a counter, a reference value, and an accumulator for keeping track of time in the system clock.

Typically, an MPU has a core-clock distribution network that is part of the system clock. The core-clock distribution network is referred to as the core "mesh-clock". Every clock cycle, a counter within the mesh-clock increases its count value. If the value of the counter equals a preset reference value, a signal is sent to an accumulator within the mesh-clock. The signal that is sent to the accumulator represents an incremental increase in time. This time is used as MPU system-time, for use with such things as time-stamping files, and so forth. After the signal is sent to the accumulator, the counter is reset to zero, and the counter continues to receive time pulses and send accumulator updates each time the reference value is matched. The reference value is set by the MPU. The reference value is a function of the number of clock cycles of the processor per given unit of time.

However, there is a problem with this approach. It can be desirable for the MPU to change its frequency of operation in the middle of a time count. For instance, the MPU is to change from 1 GHZ to 1.33 GHZ when the count of the counter of the mesh-clock is one or more, but the count does not equal the reference value. This creates a problem. If the MPU keeps the original reference value as the trigger, the timing pulse to the accumulator will originate too quickly and the MPU clock will be too fast. If the MPU changes mid-count to the new reference value, the time increment can be inaccurate for that time period. Furthermore, this error is cumulative. In other words, if the frequency switch occurs a plurality of times, the errors from each switch will add together over time and can be substantial.

In a second approach, the counter of the mesh-core receives its counts directly from a "free-running clock" at a fixed frequency, and not as a function of the frequency of the MPU. The free-running clock can be provided as an external source to the MPU or as a separate internal clock that does not change frequency with the frequency of the MPU. In this implementation, the counter is reset after each addition (or couple of additions). The reset is a function of the MPU clock speed. In this approach, the MPU gives a signal to read the number of oscillations of the free-running clock, and this is added to the accumulator of the core-mesh (the time-keeper that is keeping track of the core frequency count). In this aspect, the counter sends the total count since the last reset to the core clock in parallel and simultaneously with the update signal to the accumulator. The count is added to the accumulator each time the update signal is detected.

An advantage of this approach is that the core mesh-clock can have its own operating frequency (which is slower than the free-running clock), and the ratio between the free-running clock and the mesh-clock can be variable. The accumulator of the core-mesh receives the number representing the previous number of oscillations since the last oscillation in parallel and adds this to its current value.

However, one problem with this free-running clock implementation is that the skew between the free-running clock and the core mesh-clock of the PU must be matched. Skew can generally be defined as the delay between a transition from one logic level to another logic level. Because the accumulator which resides in the core mesh-clock domain is receiving the update signal and count in parallel, all signal transitions must be received by the core clock before it sends a reset signal to the counter. As the parallel signals can have differing transmission speeds, the core mesh-clock cannot be sure when the accumulator has received an accumulated count before sending the reset signal to the counter.

One way to compensate for the skew is to require some kind of feedback between the core clock and the free-running clock to inform the free-running clock the actual signal has been received by the accumulator by the core mesh-clock. But this creates a recursion problem—that is, when does one clock system stop acknowledging the acknowledgment of a second clock system. Furthermore, the free-running clock always has to be the fastest clock, or else the required size of the counter increases in an unbounded fashion. Finally, with parallel propagation of signals, the potential arises for many long wires and signal re-powering circuitry that can be costly to the implementation.

Therefore, there is a need for a method of changing the clock speed of a chip without disrupting the timekeeping ability of the chip in a way that addresses at least some of the problems associated with conventional methods to change clock frequencies on a chip.

SUMMARY OF THE INVENTION

The present invention provides for a system for generating a clock-mesh signal. A latch is coupled to the output of a first clock. An inverter is coupled to the output of the first latch. At least one other latch is coupled to the output of the first latch. An edge detector is coupled to the output of at least one other latch. An incrementer is coupled to the output of the edge detector. A memory is coupled to the output of the incrementer.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs, unless otherwise indicated.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
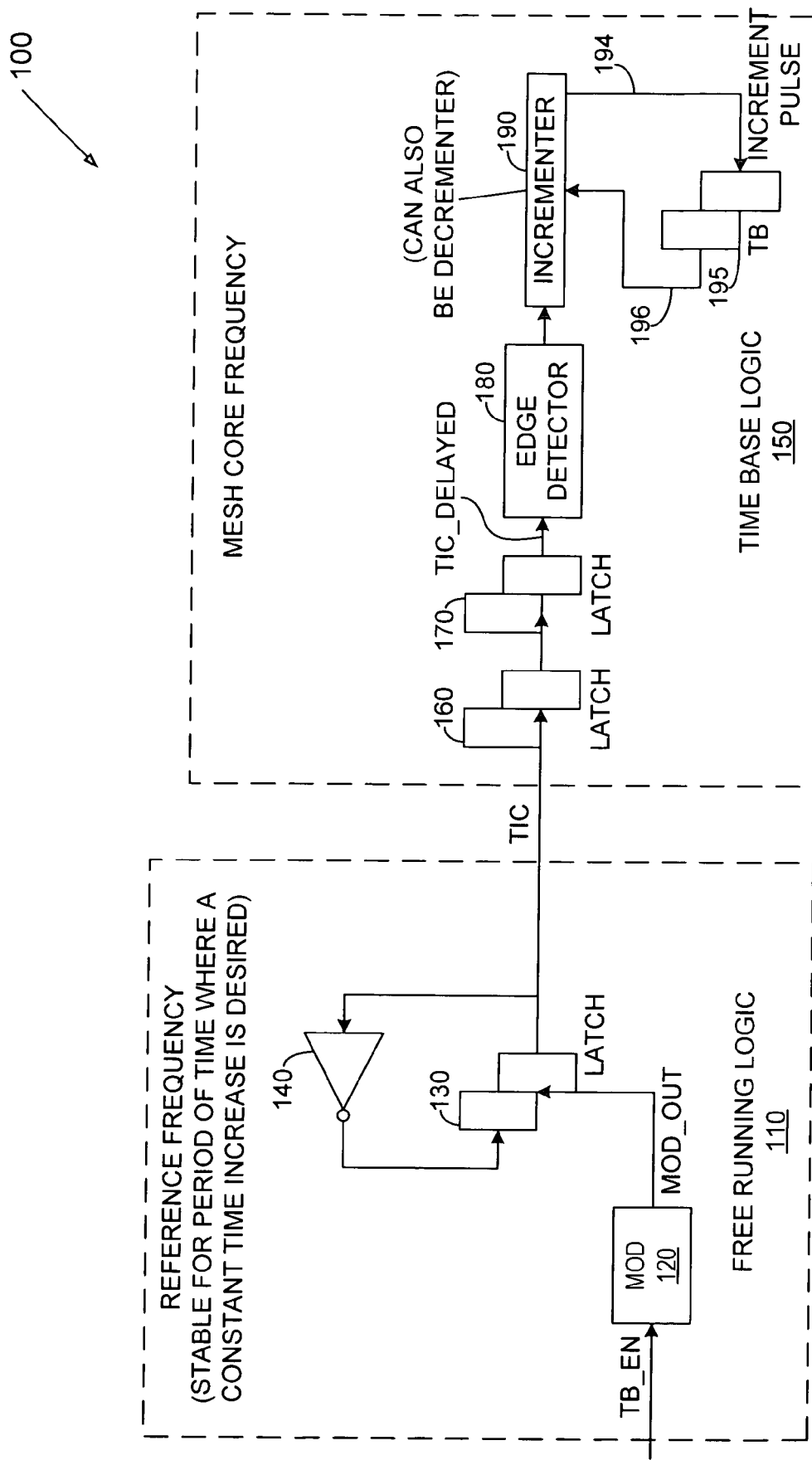
FIG. 1 schematically depicts a system for running timekeeping logic in the mesh-clock domain from an update signal originating in the free-running clock domain.

Turning to FIG. 1, disclosed is a free-running clock system 100. In the system 100, free-running logic 110 is coupled to time-base logic 150. In the system 100, a free-running clock 120 sends a mod_out signal to enable a latch 130, one mod_out pulse per cycle or per few cycles of the free-running clock, depending upon the mod (modular) number. TB_EN enables the mod function. TB_EN acts as a start signal to the time-base logic 110. A mod function generates a pulse for a given number of clock cycles. The free-running clock 120 employs a counter that counts the number of cycles and generates a pulse that enables or disables the latch 130. If a latch is disabled, it ignores its input and maintains its output from the last time it was enabled. If a latch is enabled, it transfers its input value to its output with a one-cycle delay. The output of the latch 130 is inverted by an inverter 140 and feeds back to the input of the latch 130. Therefore, when the cycle mod_out is high, or the latch 130 is enabled, the output of the latch 130 has an inverting pattern, which creates a tic value.

A tic value can be generally defined as the latched output of the latch 130. Then, the tic value is sent to the time-base 150 logic as a DC signal (note that this signal is to meet the minimum skew set by a processor technology). A DC signal maintains a constant value regardless of the clock domain that it resides in. The value of a DC signal can be changed, but the change will happen asynchronously to the clock domain that the DC signal resides in. This leads to a meta-stable condition for latches that have DC signals as inputs since the DC signal may transition slowly, and for a small period of time, fall within the noise-margin of the latch input (leading to unpredictable results at the output of the latch). Hence, the output of latch 160 could be meta-stable. Because there is a skew between reference frequency of the free running logic 110 and core frequency of the time base logic 150, adding a plurality of secondary latches 160, 170 dramatically decreases the chances of the tic signal being meta-stable (with enough secondary latches, the probability of encountering a meta-stable signal is insignificant for purposes of proper timekeeping). The reference frequency (associated with the free-running clock 120) is a frequency which is stable for a period of time where a constant time increase or decrease is desired.

The latches 160, 170 are toggled by the frequency of oscillation of the MPU, which is faster than the tic rate. These toggled latches 160, 170 create a tic_delayed signal. After receiving a tic_delayed signal over a tic_delayed input, an edge detector 180 sends a signal to an incrementer (or decrementer) 190. The edge detector 180 tests either the falling or rising edge of the tic_delayed signal and sends an increment pulse to the incrementer 190 on either edge, as appropriate (an edge detector detects logic level transitions of its input and produces a pulse on its output for each transition). The incrementer 190 receives the present time-base value (that is, the time that is to be used as the PU system clock) over the signal line 196 from the time-base (TB) memory 195. The incrementer 190 increments the value received from the TB memory 195 and sends the incremented value back for storage in the TB memory over line 194 again after receiving the tic_delayed value (this can be an incremented value or decremented value, as appropriate).

The tic rate is limited by the following factors, and is a function of at least these factors. A first restriction is that the twindow is at least the period of time necessary to handle meta-stability of a signal when such signal is entering from an asynchronous domain (an asynchronous domain is one in which the ratio of the clock for the external domain to the internal domain is a non-integer value). In most cases, such a period is greater or equal to the time of the slowest frequency that the time base logic 150 is designed to handle. Twindow has added to it the time lost from frequency switching, if any, from one MPU cycle speed to another MPU cycle speed. Finally, the time that it takes for the incrementer 190 to increment at a given MPU frequency is added to the twindow. When added together, this value is twindow of the free-running logic 110. The inversion of this is the maximum tic rate of the free running logic 110.

A second restriction is that the twindow must be at least the clock-cycle time at the slowest frequency of the MPU plus a guard band. The guard band can be generally defined as extra time that is added to the twindow to allow for variations of conditions within the system 100. These factors can be temperature, speed of propagation of signals, and so on. In other words, the tic rate cannot be faster than the slowest core clock-mesh frequency of the time-base logic 150, plus a guard band. This avoids the problems with the transitions of the latches 160, 170 being slower than the input tic rate. The minimum tic time is the larger of these two additions. However, the second restriction will typically be less restrictive than the first restriction (that is, the guard band will typically be less than the other factors of frequency switching from one MPU cycle speed to another MPU cycle speed plus the time that it takes for the incrementer 190 to increment at a given MPU frequency). Therefore, the minimum limits of twindow are typically set by the first restriction.

Figure 2:
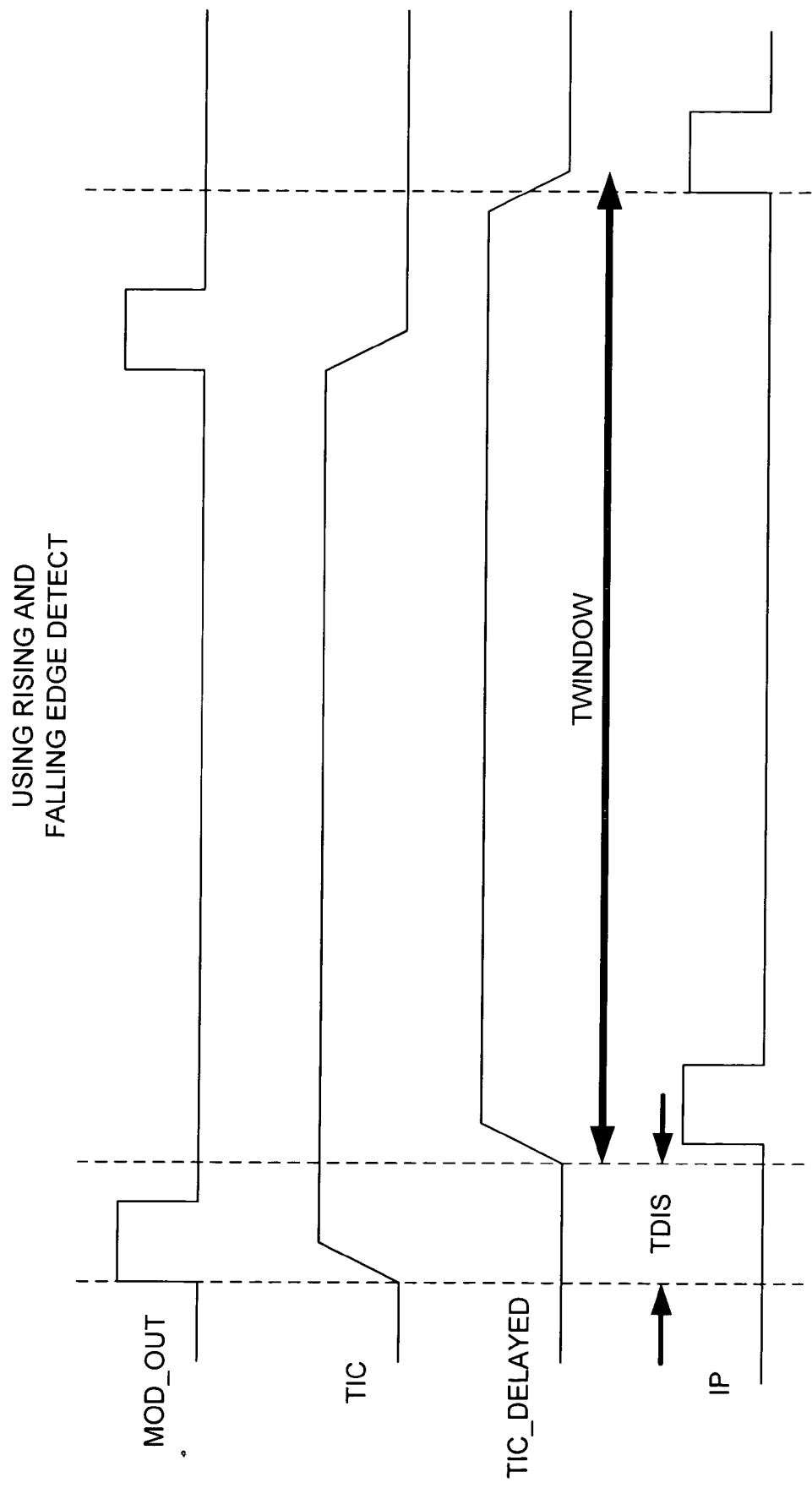
FIG. 2 illustrates a rising and falling edge detect window, "twindow", which represents the minimum-time, free-standing-clock logic levels used when a logic level output transitions between a rising edge and a falling edge or between a falling edge and a rising edge.

Turning now to FIG. 2, illustrated is a timing diagram for a twindow associated with the system 100. FIG. 2 illustrates the initial mod_out signal from the free-running clock 120 as a one-cycle pulse. With each rising mod_out pulse, the tic output is generated within the latch 130. The high and low voltage levels of the tic ouptut are delayed by the secondary latches 160, 170 and manifest as the tic_delayed signal. The time tdis represents the delay time between the tic signal and the tic_delayed signal. Upon the receipt of a rising or falling edge of the tic_delayed signal by the edge detector 180, an increment pulse (ip) signal is sent over a connection 194 to the time-base memory 195, wherein the system time is stored. The time between the mid-point of a tic_delayed edge to the mid-point of the next edge represents the twindow.

To reiterate what was stated in FIG. 1, above, following are the two requirements for the determination of length of the twindow presented in detail. The first requirement is that the twindow is at least the period of time necessary to handle meta-stability of a signal when such a signal is entering from an asynchronous domain (in most cases, such a period is greater or equal to the slowest core mesh-clock cycle time), plus the time lost during the frequency switch, plus the number of cycles required to increment the incrementer 190 multiplied by the slowest frequency rate of the PU. The second requirement is that the time window is greater than the core clock cycle time at the slowest frequency possible, plus a "guard band" number of cycles. Tic rate is the lower of these two requirements, although more guard-band can be added to the first requirement, as well. The twindow is the inverse of the tic rate.

Figure 3:
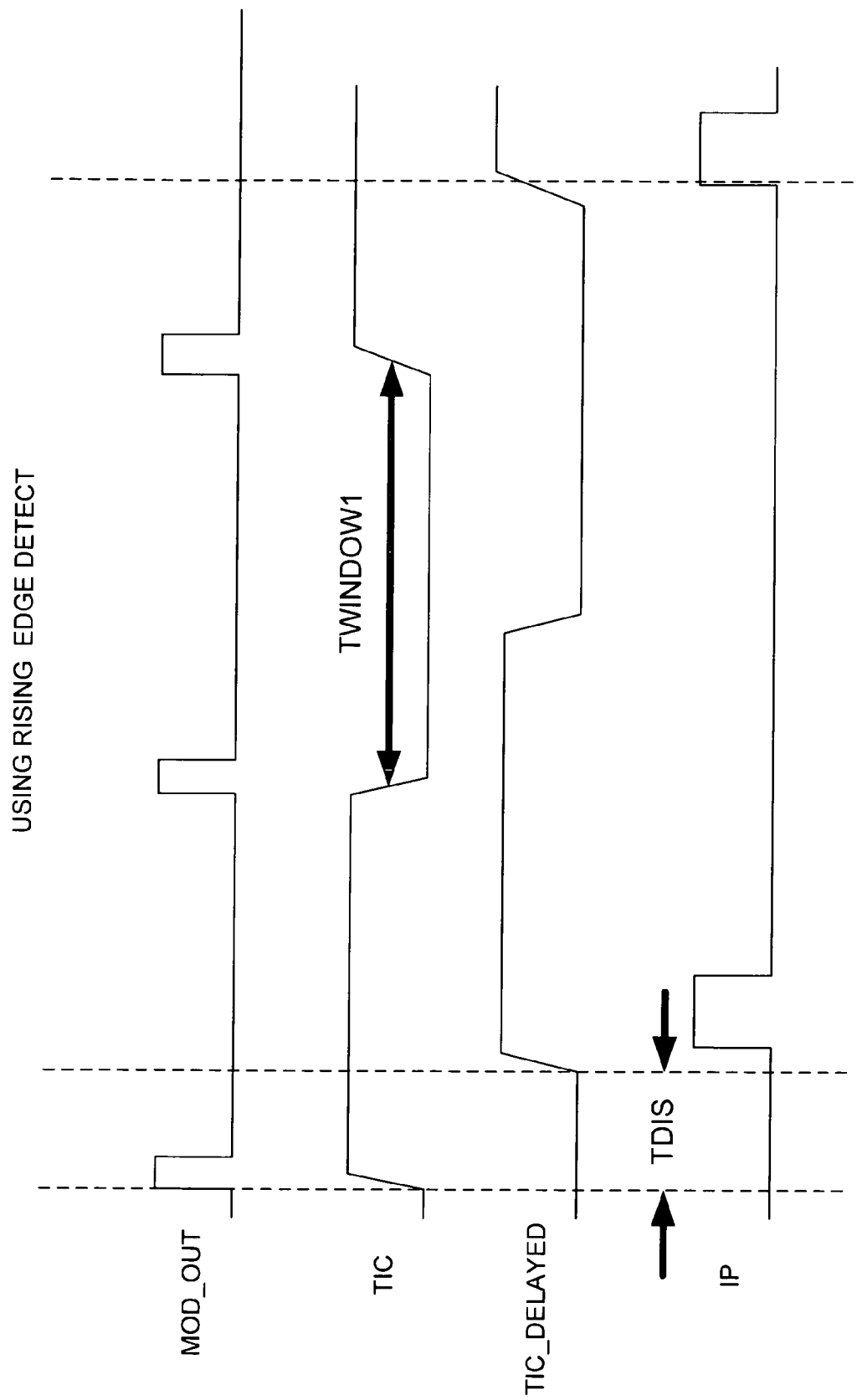
FIG. 3 illustrates a rising edge detect window "twindow1", which represents the minimum-time, free-standing-clock logic levels used when a logic level output transitions between a rising edge and a falling edge.

Turning now to FIG. 3, a rising edge detection system is illustrated. In FIG. 3, whenever the tic_delayed pulse transitions from a low value to a high value, the incrementer 190 generates an "ip" signal. The frequency of the time base logic 150 defines a minimum time width in which the incrementer 190 is to create its core mesh-clock frequency, thereby placing a maximum value on the free-running clock 120 frequency. The time window of FIG. 3, twindow1 (the time between the falling and rising edge on a tic pulse), has to be equal or greater than twice the slowest core time (that is, the frequency of the time base logic 150) plus a guard-band. This means that the synchronous system is typically guaranteed to handle the pulse transitions. Twindow1 of FIG. 3 is larger than twindow of FIG. 2, and therefore, the tic rate is slower on the rising edge detect than on a rising and falling edge detect if the tic rate is limited by the second factor stated earlier.

The tic rate is limited by the following restrictions, and is a function of at least these two restrictions. The first restriction is that the frequency at which tic can toggle cannot be faster than the slowest allowable core mesh-clock frequency. In other words, twindow represents a minimum period of time necessary to handle meta-stability of a signal when such signal is entering from an asynchronous domain (in most cases, such a time period is greater or equal to the slowest core mesh-clock cycle time), plus the time lost during a frequency switch from one MPU speed to a second MPU speed. Furthermore, to this is added the time required to increment the incrementer 190 for a count (for instance, some adders can require 8 cycles to perform an add) multiplied by the slowest frequency rate of the MPU, thereby yielding a time value. When added together, this value is twindow of the free-running logic 110. The inversion of this is the maximum tic rate.

A second restriction is that the twindow must be at least twice the cycle time at the slowest core frequency plus a guard band. This avoids the problems with the transitions of the latches 160, 170 being slower than the input tic rate. The minimum tic time is the larger of these two additions. However, unlike the twindow of FIG. 2, the second restriction can be more restrictive than the first restriction. In other words, the second restriction becomes more restrictive, and can further lengthen twindow, thereby lessening the tic rate.

Figure 4:
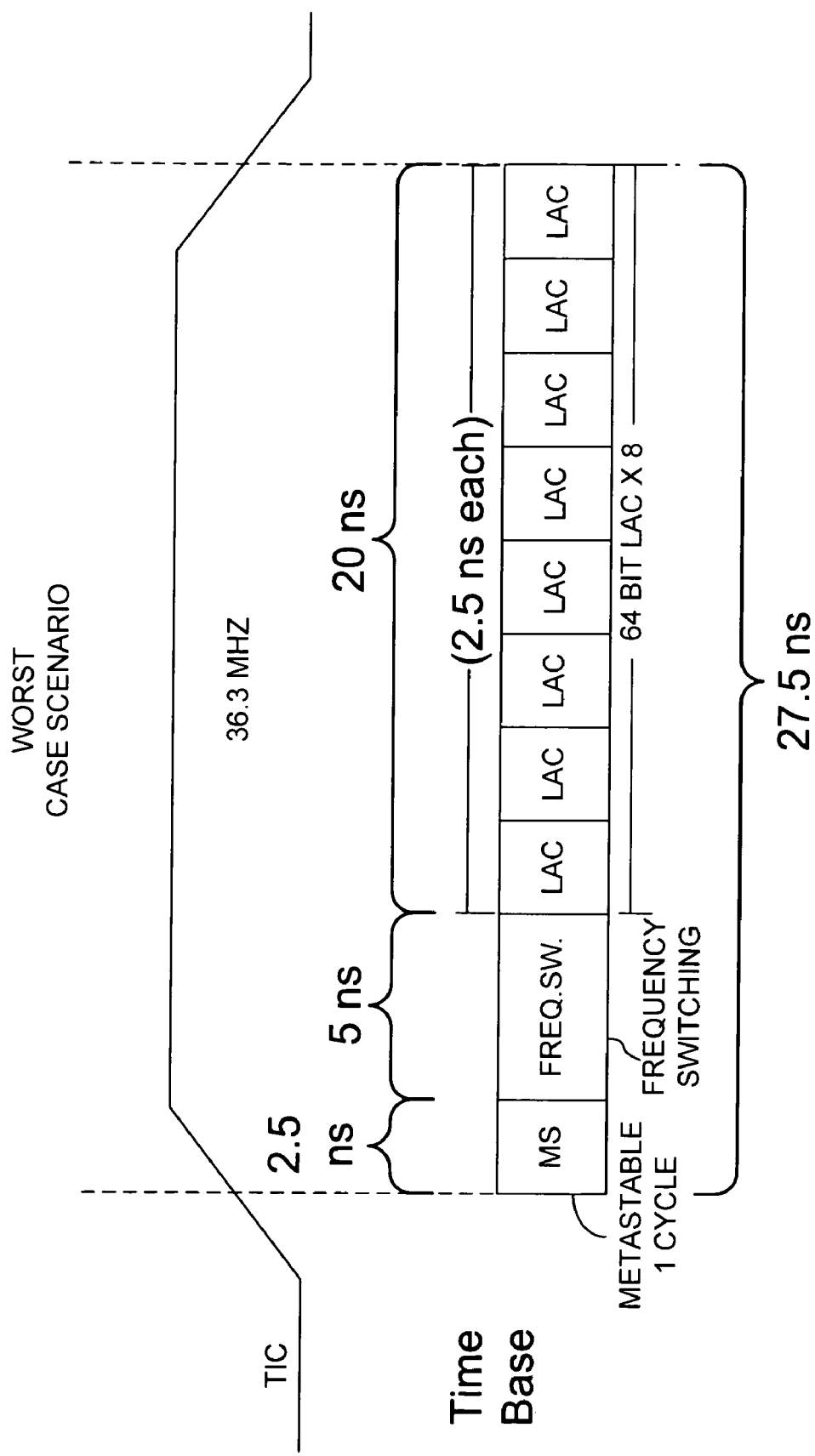
FIG. 4 illustrates a timing window "twindow" example for FIG. 1 for a tic-rate of 33 MHZ.

Turning now to FIG. 4, illustrated is an example of a tic rate calculation given a minimal core clock frequency of 400 MHz. Given that the system loses 5 ns due to frequency switching and the adder 190 is an 8-stage incrementer, each stage of which takes 2.5 nanoseconds, this yields a total of 20 nanoseconds. In other words, twindow has a length of 27.5 nanoseconds. Tic rate is the inverse of 27.5 nanoseconds, which is 36.3 MHZ. In other words, the fastest tic frequency available to FIG. 1 when FIG. 1 uses the above parameters is 36.3 MHZ.

Figure 5:
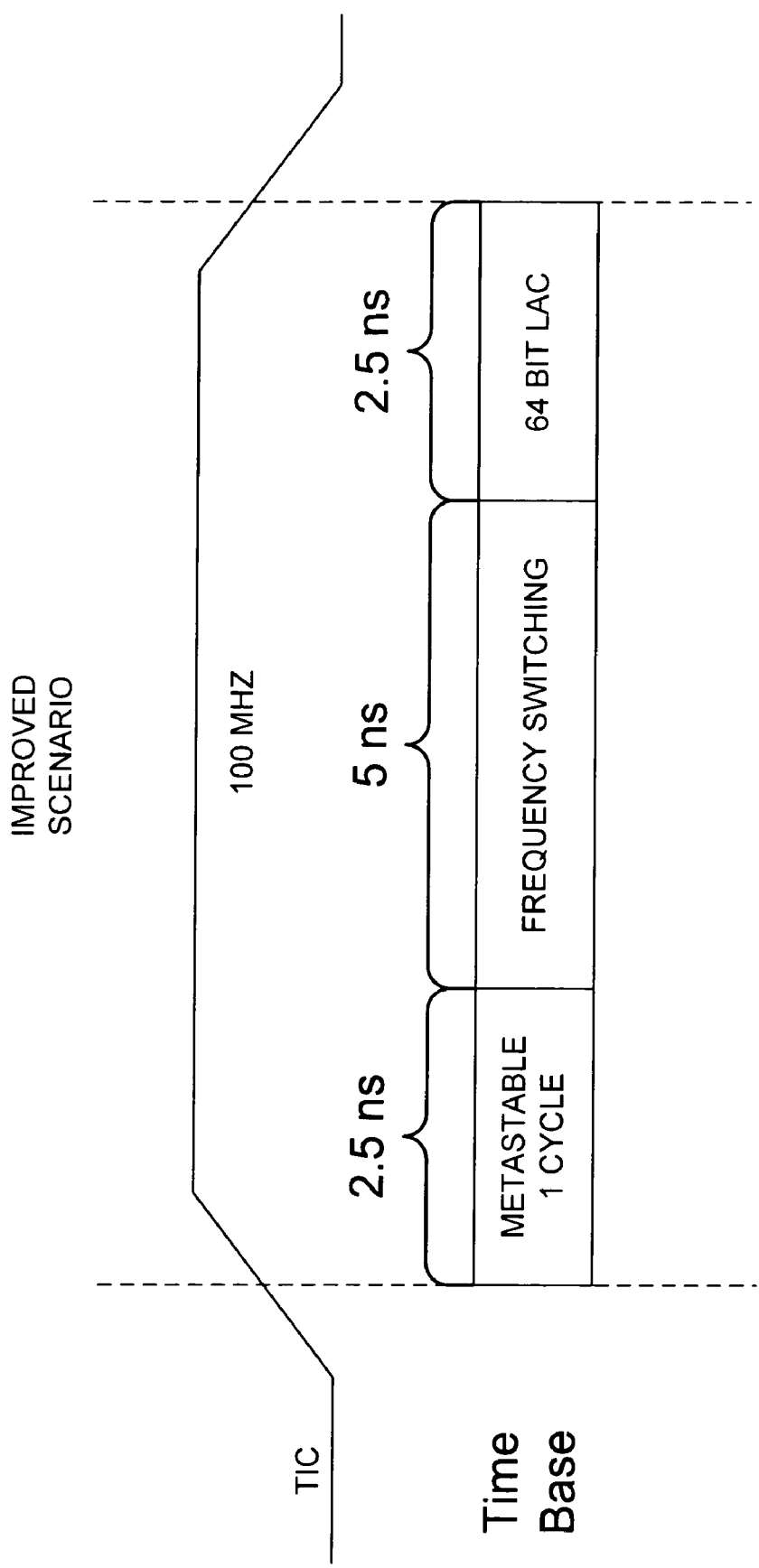
FIG. 5 illustrates a timing window "twindow" example for FIG. 1 with substitutions made for specific elements of FIG. 1.

Turning now to FIG. 5, illustrated is the result of changing some parameters of the twindow, as illustrated in FIG. 4, by altering characteristics of various elements of FIG. 1, or by otherwise adding specific elements to the system 100. In FIG. 5, the tic rate calculation is a minimal core clock frequency of 400 MHz.

In FIG. 5, illustrated is one result if the incrementer 190 is changed to a 1-stage 64 bit adder. As is understood by those of skill in the art, the 1-stage 64 bit adder requires one clock cycle to complete the addition, as opposed to the 8 cycles of the adder of FIG. 4. Alternatively, the system 100 can otherwise adjust the number of cycles of the time-base core frequency through changing the switching speed of the core frequency 150. In the system 100 of FIG. 2, twindow>=clock cycle frequency at the slowest possible frequency plus the time to switch from one PU speed to another PU speed plus the time to increment. In FIG. 4, tic>=2.5 ns+5 ns+2.5 ns (the time to perform the twindow=10 ns), which is faster than if the incrementer 190 uses multiple clock pulses. By doing so, the frequency can be changed from 33.6 MHz to 100 MHz, a 300% improvement.

In a further embodiment, a 2-deep First in/Last out memory is employed to store the tic edges to remove the 5 ns time loss from frequency switching. In this embodiment, 2.5 ns+2.5 ns=5 ns twindow, which corresponds to a tic rate of 200 MHZ. The actual tic frequency can be increased but will typically not reach the limit of 200 MHz in this embodiment. This assumes that core frequency changes less frequently, compared to the tic time.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

What is claimed is:

1. A system for keeping time in a clock domain, comprising:
   a free-running clock domain having:
      a first latch coupled to an output of a free-running clock;
      an inverter coupled to an output of the first latch; and
   a core mesh-clock domain having:
      at least one or more secondary latches coupled to the output of the first latch;
      an edge detector coupled to an output of the secondary latches;
      an incrementer coupled to an output of the edge detector; and
      a memory coupled to an output of the incrementer.

2. The system of claim 1, wherein the secondary latches comprise at least two latches coupled in series.

3. The system of claim 1, wherein an output of the memory is coupled to an input of the incrementer.

4. The system of claim 1, wherein the free-running clock is running at an frequency different than a core mesh-clock.

5. The system of claim 1, wherein the memory is employable as a storage device for measuring a passage of time.

6. The system of claim 1, wherein the first latch outputs a digital value.

7. The system of claim 1, wherein there is a single signal line between the first latch and the one or more secondary latches that crosses between the free-running clock domain and the core mesh-clock domain.

8. The system of claim 1, wherein the memory is incrementing at a frequency slower than the free-running clock is incrementing.

9. A method of generating a constant time incremental change, comprising:
   generating a clock pulse;
   generating a voltage level from the clock pulse;
   delaying the voltage level through the use of at least one latch;
   detecting an edge on the voltage level by an edge detector;
   incrementing a value based upon an edge detection; and
   storing said increment value.

10. The method of claim 9, wherein the increment value represents a second clock frequency.

11. The method of claim 9, wherein the voltage level is inverted and input into a latch.

12. The method of claim 9, wherein the increment value is stored in a memory.

13. The method of claim 12, wherein an output of the memory is used by an incrementer to increment to the a next value.

14. The method of claim 9, wherein the step of delaying the voltage level employs a plurality of latches in series.

15. The method of claim 9, wherein an incrementer employs an n-bit adder.

16. The method of claim 9, wherein a clock frequency from the clock pulse and a core mesh-clock frequency from the increment value are not the same frequency.

17. The method of claim 9, wherein an enable signal is conveyed to a clock for generating the clock pulse.

* * * * *